(12) United States Patent
Fouarge et al.

(10) Patent No.: US 8,025,847 B2
(45) Date of Patent: Sep. 27, 2011

(54) SLURRY LOOP REACTORS

(75) Inventors: Louis Fouarge, Dilbeek (BE); Carl VanCamp, Beveren-Waas (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/777,333

(22) Filed: May 11, 2010

(65) Prior Publication Data

US 2010/0273961 A1    Oct. 28, 2010

Related U.S. Application Data

(60) Continuation of application No. 11/501,181, filed on Apr. 8, 2008, now abandoned, and a continuation of application No. 12/243,346, filed on Oct. 1, 2008, now abandoned, which is a division of application No. 11/057,715, filed on Feb. 14, 2005, now abandoned.

(60) Provisional application No. 60/544,846, filed on Feb. 13, 2004.

(30) Foreign Application Priority Data

Feb. 13, 2004  (EP) .................................. 04100579

(51) Int. Cl.
*B01J 19/18* (2006.01)
*B01J 19/24* (2006.01)
*C08F 2/14* (2006.01)

(52) U.S. Cl. ............ 422/132; 422/134; 525/52; 525/53; 526/64; 526/65

(58) Field of Classification Search .................. 422/132, 422/134; 525/52; 526/64, 65
See application file for complete search history.

(56) References Cited

U.S. PATENT DOCUMENTS 7,034,092 B2 * 4/2006 Marechal ........................ 526/65
2003/0191251 A1   10/2003 McGrath

FOREIGN PATENT DOCUMENTS

EP           1564224 A1 *   8/2005

* cited by examiner

*Primary Examiner* — Roberto Rabago

(57) ABSTRACT

Reactor systems suitable for the polymerization of an olefin monomer including first and second loop reactors effective for the polymerization of an olefin monomer and polymers formed therefrom are described herein. Each of said reactors generally include at least one settling leg connected to said reactor for receiving polymer slurry from said reactor and sequentially discharging settled polymer from said at least one settling leg to withdraw said polymer slurry from said reactor; a transfer line extending from the outlet at least one first reactor settling leg to an inlet for said second loop reactor; a flash line extending from said transfer line at a valve location intermediate said first reactor settling leg and said inlet for said second reactor; and a multiway valve located in said transfer line at said valve location intermediate said first reactor settling leg and the inlet to said second reactor and having one position in which said multiway valve provides for the flow of polymer slurry through said transfer line to said second reactor and another position in which said first reactor settling leg is connected to said flash line for the discharge of polymer slurry from said first reactor settling leg to said flash line and removal of said polymer from said polymer system.

7 Claims, 2 Drawing Sheets

SLURRY LOOP REACTORS

CROSS-REFERENCE TO RELATED APPLICATIONS

This application claims the benefit of U.S. patent application Ser. No. 11/501,181, filed Apr. 8, 2008, now abandoned and U.S. patent application Ser. No. 12/243,346, filed Oct. 1, 2008, now abandoned, which claims priority from U.S. patent application Ser. No. 11/057,715, filed Feb. 14, 2005 (now abandoned), which claims priority from U.S. Pat. Appl. Ser. No. 60/544,846, filed Feb. 13, 2004 (now abandoned).

The sublet of the present invention relates to the polymerization of olefin monomers in slurry loop reactors and particularly to an apparatus and a method to switch such reactors from parallel to series configuration and vice-versa.

The use of slurry-loop reactor systems in the polymerization of olefin monomers is well known in the art. (see for example U.S. Pat. No. 2,285,721). In such system, it is desirable to separate the polymer and the liquid medium comprising an inert diluent and unreacted monomers without exposing the liquid medium to contamination so that said liquid medium can be recycled to the polymerization zone with minimal or no purification. As described in U.S. Pat. No. 3,152,872, a slurry of polymer and the liquid medium is collected in one or more settling legs of the slurry loop reactor from which the slurry is discharged to a flash chamber. The mixture is flashed in order to remove the liquid medium from the polymer.

For years, those slurry-loop reactors have been operated in a stand-alone configuration for, e.g., the production of monomodal polyolefins.

It has also been known in the art (since for example EP 0 057 420 or EP 0 022 376) that polymerization reactors can be connected in series with, as a result among others, the production of polyolefins with a wide molecular weight distribution, very good homogeneity and outstanding mechanical and processing properties.

The "modality" of a polymer refers to the form of its molecular weight distribution curve, i.e. the appearance of the graph of the polymer weight fraction as function of its molecular weight. If the polymer is produced in a sequential step process, utilizing reactors coupled in series and using different conditions in each reactor, the different fractions produced in the different reactors will have their own molecular weight distribution. It is to be noted that also the chemical compositions of the different fractions may be different.

There however remains the need to be able to produce several kinds of polyolefins such as monomodal or multimodal grades from reactors whether or not connected in series, for different reasons such as a particular need for certain mechanical properties (exclusively obtained either in parallel or in series configuration), for a given residence time, for certain catalyst combination, production issues, equipment availability, plant flexibility.

Until now, polyolefin manufacturers have been able to manage production of the several kinds, of above mentioned polyolefin grades by:
  either having dedicated single polymerization reactors on the one hand end dedicated polymerization reactors connected to each other and operated in series, on the other hand,
  or being obliged to swing from series to parallel on the same reactor trains.
The first solution is extremely capital intensive.
The second one is extremely time and operation consuming. In this second option, large pieces of connection pipes must indeed be assembled and later disassembled and reassembled again, with all their related utility lines such as flushing lines, heat exchange jackets, measurement and control devices, frame supports, . . . . Connections can often be damaged and the risk for a catastrophic accident is real so that operations are not smooth and are slow down anyway.

A slurry loop reactor run on its own with its settling legs and flash line is already known and does not have to be described here; reference is made, for example, to U.S. Pat. No. 3,152,872-A, U.S. Pat. No. 3,242,150-A and U.S. Pat. No. 4,613,484-A.

Embodiments to operate reactors connected in series are described in details in, for instance, U.S. Pat. No. 6,185,349, U.S. Pat. No. 4,297,445, BP 0 057 420.

DESCRIPTION OF THE INVENTION

Figure 1:
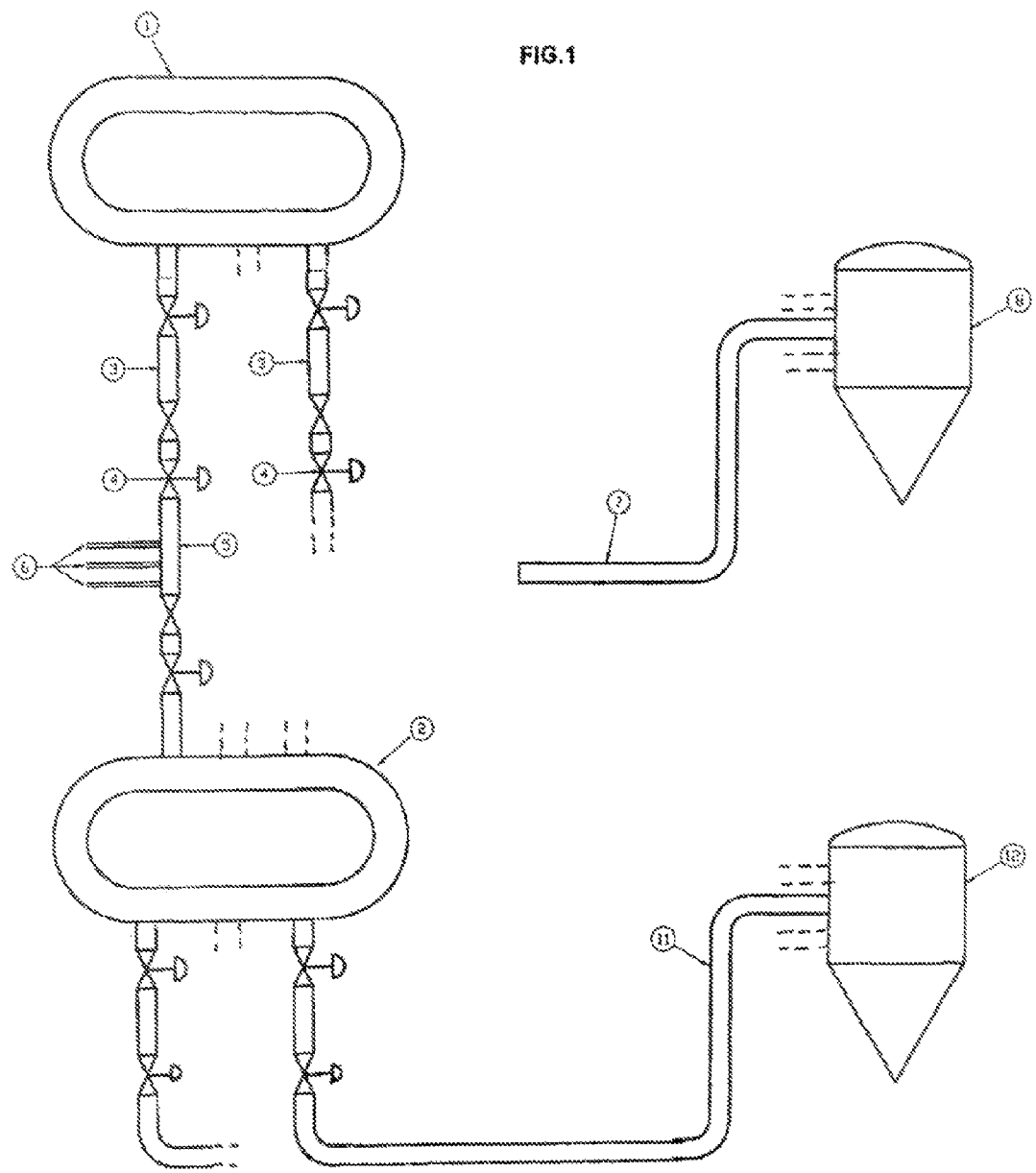
FIG. 1 represents a schematic part of the process flow diagram of an ethylene polymerization unit.

An example of current disassembling procedure "series-parallel" is given here below supported by FIG. 1.

When operated in series, according to one embodiment, reactor 1 and reactor 2 are connected to each other, in particular, through one or more settling leg 3 (said settling leg being regulated by a control valve 4) and line 5, iso-butane flushing connections 6 are made into connection line 5. Slurry is transferred from reactor 1 to reactor 2. In this series configuration, flash line 7 going to flash tank 8 is not in service. Flash line 11 going from reactor 2 to flash tank 12 is in service. For transitioning to parallel configuration, one has to stop the reaction, empty the reactors, dismount connections 6, take away connection line 5, and connect flash line 7 to the control valve 4. The complete operation from shut down to start up (indifferently from series to parallel or vice versa) takes up to 72 hrs.

It is an object of the present invention to provide an apparatus and an effective method to easily switch from series to parallel configuration of the slurry loop reactors and vice-versa. It is anticipated that such method can be applied to any type of olefin polymerization such as in closed reaction vessels provided with stirring means, gas phase reactors and combination of those.

Figure 2:
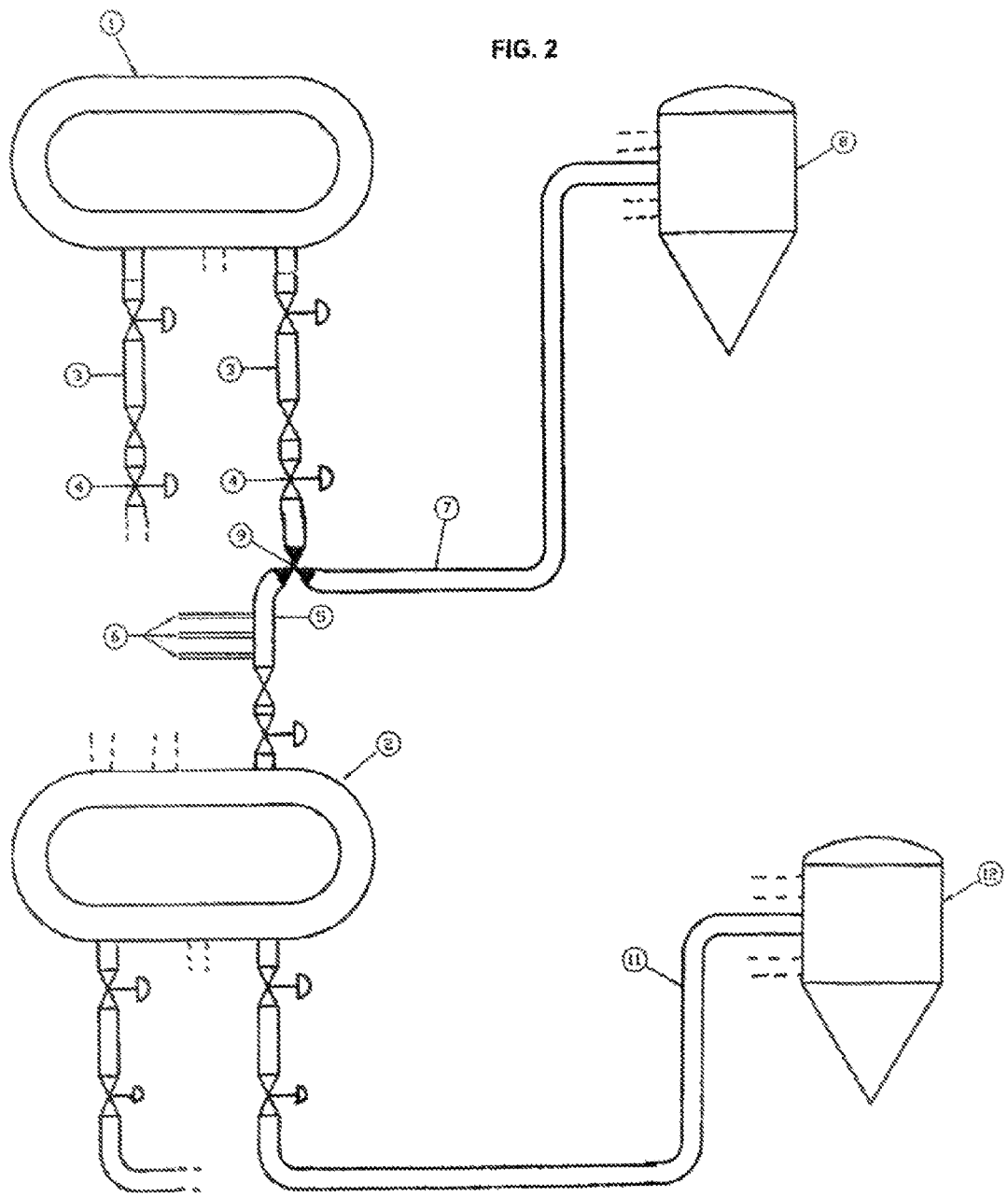
FIG. 2 represents a schematic part of the process flow diagram of an ethylene polymerization unit, incorporating the present invention.

Accordingly the present invention discloses an apparatus to easily switch from series to parallel configuration of slurry loop reactors and vice-versa and the related method. The disclosure is supported by FIG. 2, which represents a schematic part of the process flow diagram of an ethylene polymerization unit incorporating the present invention.

All connections 6 remain at their place for series or parallel and the choice for one configuration or the other is made through the position of the three-or more-way valve 9 positioned after the control valve 4 of the one or more settling legs 3. The three-or more-way valve is open in the direction 1-2 when the reactors are operated in series. The three-or more-way valve is open in the direction 1-3 when reactor 1 is run individually.

Up to the invention, three-or more-way valves were not expected to work properly because they are known to leak in their non-used direction and to get easily blocked by undesired polymerization in the non-used pipe (said non-used pipe being either the one or more transfer legs/connection lines 3-5 to reactor 2 when the reactors are run in parallel configuration or, the one or more flash lines 7 to the flash tank 8 of reactor 1 when reactors are run in series configuration). Blocking the non-used pipe means the obligation for the exploitation manager to kill the polymerization reaction in the two reactors, empty the reactors from all their slurry, clean the blocked sections, possibly change the blocked valve and reassemble everything. The complete operation takes up to 120 hrs, which makes it completely prohibitory from a financial point of view. Safety issues are not of the least either.

Moreover, control valves were not expected to work properly from a process point of view (i.e. to enable transfer of sufficient amounts of solids) together with three-or more-way valves, said three-or-more-way valves that would have indifferently imposed on the control valves a pressure differential of about the value of the nominal pressure of each reactor—i.e. several tens of bars—(when reactors are operated in parallel, i.e. with the settling leg discharging the slurry from reactor 1 run at its nominal pressure $p_1$ into the flash line maintained around atmospheric pressure) or a pressure differential of a few bars (when reactors are operated in series, i.e. with the settling leg transferring the slurry from reactor 1 run at pressure $p_1$ into reactor 2 run at pressure $p_2$, with $p_1 > p_2$, allowing the transfer).

It has been surprisingly found that control valves 4 and three-or more-way valves 9 can however be positively used in the following apparatus:

a set of loop reactors suitable for the polymerization process of a monomer, preferably ethylene and optionally an olefin co-monomer, comprising for each of said reactors:
  a plurality of interconnected pipes P defining a flow path for a polymer slurry, said slurry consisting essentially of ethylene, optionally a co-monomer, a polymerization catalyst, liquid diluent and solid olefin polymer particles,
  means for feeding monomer, optionally a co-monomer, diluent and optionally hydrogen in the reactor,
  means for feeding a polymerization catalyst in the reactor,
  a pump suitable for maintaining the polymer slurry in circulation in such reactor,
  one or more settling legs connected to the pipes P of such reactor for settling of polymer slurry,
  one or more control valves connected to the outlet of such settling legs, and
  one or more flash lines for discharging settled polymer slurry out of the reactor
  characterized in that each of said loop reactors comprises a three-or-more-way valve defining three-or-more ends, one end A being positioned at the outlet of said one or more control valves, another end B being connected to said one or more flash lines and another end C being connected to the pipes P of another reactor of the set through a connection pipe 5.

In a second embodiment of the present invention, the diameter of the one or more control valves, flash lines, connection lines K and three-or-more-way valves are within a relative ratio of from 0.5 to 2, preferably of from 0.65 to 1.55 and more preferably of from 0.8 to 1.2

In a third embodiment of the present invention, the length of the one or more flash lines divided by the length of the one or more connection pipes K is within a range of from 6 to 14 and preferably from 8 to 12.

In a fourth embodiment of the present invention, any end of three-on-more-way valve, which is not connected to either a flash line or another reactor of the set is flushed with a diluent suitable with the polymerization process.

In a fifth embodiment according to the present invention, a continuous over-pressure of a diluent suitable with the polymerization process is maintained at the opposite side of the used connection (said used connection being either A to B when reactors are run in parallel configuration or, A to C when reactors are run in series configuration).

In a sixth embodiment according to the present invention, a continuous over-pressure of a diluent suitable with the polymerization process is maintained at the side of the non-used pipe (said non-used pipe being either the transfer legs/connection lines 3-5 to the second reactor when the reactors are run in parallel configuration or, the flash lines 7 to the flash tank 8 of the first reactor when reactors are run in series configuration).

In a seventh embodiment according to the present invention, a diluent suitable with the polymerization process is circulated throughout the reactors for a period of eight hours before transitioning from series to parallel configuration or vice versa.

In a eight embodiment according to the present invention, when the diluent suitable with the polymerization process is iso-butane, the foil capacity of iso-butane dedicated to all reactors is applied in sequence to each individual reactor during the circulation period.

In a ninth embodiment according to the present invention, olefin-free recycled iso-butane is fed into the reactors during the circulation period.

EXAMPLES

Example 1 and Comparative Example 1

The same high-density polyethylene was produced on the same reactors connected in series according to the invention (E1) and after conventional assembling (CE1), in both cases, starting from reactors previously run individually (parallel) The time between "parallel" shut down and "series" start up (Transition Time) is given in Table 1 as well as density, melt index and ESCR of each grade and running hours in series.

TABLE 1

|  | E1 | CE1 |
|---|---|---|
| Transition Time (hrs) | 12 | 66 |
| Density (g/cm$^3$) | 0.948 | 0.948 |
| MI-2 (dg/min) | 0.28 | 0.28 |
| ESCR [F-50] (hrs) | 1540 | 1540 |
| Running hours w/o problem (hrs) | >7600 | >7565 |

As can be observed from Table 1, Transition Time is substantively reduced from 66 hrs to 12 hrs for producing exactly the same product and for the essential same period of time without any leakage or blocking of the valves.

Example 2 and Comparative Example 2

A period of one year of production was recorded with and without the benefit of the invention (i.e. with the pipes designed according to the invention on the one hand—E2—and with the standard procedure of dismounting on the other hand CE2), for the manufacture of essentially the same polyethylene products in both parallel and series configuration, for a given number (12) of switches from parallel to series configuration and vice-versa. The results are gathered in Table 2.

TABLE 2

|  | E2 | CE2 |
|---|---|---|
| Number of switches | 12 | 12 |
| Running time of prime grade (hrs) | 8254 | 7234 |

As can be observed, for the same number of switches from parallel to series configuration and vice versa, the total running time of prime production is about 14% higher when taking advantage of the invention. 85 hrs in average were gained at each switch of configuration when taking advantage of the invention.

Examples 3, 4 and Comparative Examples 3, 4

Starting from the parallel configuration, two 65 m³ polyethylene slurry loop reactors equipped with three-or more-way valves and with the pipes designed according to the invention on the one hand (E3 and E4) as shown in Table 3 and with standard designed pipes on the other hand (CE3 and CE4) were run for about one month.

According to the invention, an 0.1 bar over-pressure of iso-butane was maintained at the side of the non-used pipe According to the invention, 65 kg of a blend of nitrogen with 3% oxygen was introduced in each of the reactors six hours before transitioning.

According to the present invention, olefin-free iso-butane was circulated throughout the reactors for a period of six hours before transitioning.

After that about one month production period, it was then decided to switch to the series configuration, in the examples according to the invention, transition time during the first transition was about 19 hrs. On average, for the 9 further transitions series-parallel and vice-versa of the recorded year period, transition time was about 12 hrs.

With the pipes designed as shown in Table 3 for the Comparative Examples, it was simply impossible to switch in either configuration because of several connections and valves blocked by undesirable amounts of polyethylene

TABLE 3

|  | E3 | E4 | CE3 | CE4 |
|---|---|---|---|---|
| Ratio 'Diameter Flash line/Diameter control valve' | 0.50 | 1.88 | 0.38 | 2.2 |
| Ratio 'Diameter Connection line/Diameter control valve' | 0.71 | 2.0 | 0.18 | 5.7 |
| Ratio 'Diameter Connection line/Diameter Flash line' | 1.47 | 1.1 | 0.47 | 2.6 |
| Ratio 'Length Flash line/Length Connection line' | 10.6 | 10.6 | 20 | 20 |
| Number of switches possible | >10 still running | >10 still running | 0 | 0 |

The invention claimed is:

1. A reactor system suitable for the polymerization of an olefin monomer comprising first and second loop reactors effective for the polymerization of an olefin monomer;
    a) each of said reactors having at least one settling leg connected to said reactor for receiving polymer slurry from said reactor and sequentially discharging settled polymer from said at least one settling leg to withdraw said polymer slurry from said reactor;
    b) a transfer line extending from the outlet at least one first reactor settling leg to an inlet for said second loop reactor;
    c) a flash line extending from said transfer line at a valve location intermediate said first reactor settling leg and said inlet for said second reactor; and
    d) a multiway valve located in said transfer line at said valve location intermediate said first reactor settling leg and the inlet to said second reactor and having one position in which said multiway valve provides for the flow of polymer slurry through said transfer line to said second reactor and another position in which said first reactor settling leg is connected to said flash line for the discharge of polymer slurry from said first reactor settling leg to said flash line and removal of said polymer from said polymer system.

2. The system of claim 1 further comprising a supply line connected to said transfer line adjacent said valve location in order to supply diluent liquid to said transfer line.

3. The system of claim 2 wherein said supply line is located intermediate said valve location and the inlet to said second reactor.

4. The system of claim 1 further comprising a flash tank for said first reactor and wherein the flash line extending from said transfer line is connected to said flash tank.

5. The system of claim 4 wherein the ratio of the length of said flash line divided by the length of said transfer line is within the range of 6 to 14.

6. The system of claim 5 wherein said ratio is within the range of 8 to 12.

7. The system of claim 4 further comprising a second flash tank for said second reactor and a second flash line extending from a settling leg of said second reactor to said second reactor flash tank.

* * * * *